US012611861B2

(12) United States Patent
Mikoshiba et al.

(10) Patent No.: US 12,611,861 B2
(45) Date of Patent: Apr. 28, 2026

(54) LIQUID EJECTING HEAD AND LIQUID EJECTING APPARATUS

(71) Applicant: SEIKO EPSON CORPORATION, Tokyo (JP)

(72) Inventors: Masanori Mikoshiba, Shimosuwa-Machi (JP); Motoki Takabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 18/591,995

(22) Filed: Feb. 29, 2024

(65) Prior Publication Data

US 2024/0294011 A1 Sep. 5, 2024

(30) Foreign Application Priority Data

Mar. 1, 2023 (JP) ................................ 2023-030797

(51) Int. Cl.
*B41J 2/14* (2006.01)

(52) U.S. Cl.
CPC ....... *B41J 2/14201* (2013.01); *B41J 2/14233* (2013.01); *B41J 2/14274* (2013.01); *B41J 2002/14241* (2013.01); *B41J 2002/14258* (2013.01)

(58) Field of Classification Search
CPC ........................ B41J 2/14274; B41J 2/14201; B41J 2/14233; B41J 2002/14241; B41J 2002/14258
See application file for complete search history.

(56) References Cited

U.S. PATENT DOCUMENTS 6,505,919 B1 * 1/2003 Mizutani .............. B41J 2/14233 310/330
12,207,560 B2 * 1/2025 Aiba .................... H10N 30/874
2022/0242120 A1 8/2022 Takabe

FOREIGN PATENT DOCUMENTS

JP 2022-116604 A 8/2022

* cited by examiner

*Primary Examiner* — Geoffrey S Mruk
(74) *Attorney, Agent, or Firm* — WORKMAN NYDEGGER

(57) ABSTRACT

A liquid ejecting head includes: a piezoelectric element including a piezoelectric layer; a pressure compartment substrate in which a pressure compartment is provided; and a diaphragm that applies pressure to liquid in the pressure compartment by vibrating by being driven by the piezoelectric element. The pressure compartment substrate, the diaphragm, and the piezoelectric element are stacked in this order in a stacking direction. A neutral plane of a stacked body made up of the piezoelectric element and the diaphragm is located inside the piezoelectric layer. Of two regions obtained by dividing the piezoelectric layer with respect to the neutral plane, a region located closer to the diaphragm is defined as a lower region, and a region located farther from the diaphragm is defined as an upper region. A piezoelectric constant of the lower region is less than a piezoelectric constant of the upper region.

11 Claims, 11 Drawing Sheets

FIG. 7

| SAMPLE NO. | NEUTRAL PLANE POSITION | | THICKNESS tp [nm] OF PIEZOELECTRIC LAYER | THICKNESS tpb [nm] OF LOWER PORTION OF PIEZOELECTRIC LAYER | tpb/tp | PIEZOELECTRIC CONSTANT d1 [pm/V] OF LOWER PORTION OF PIEZOELECTRIC LAYER | PIEZOELECTRIC CONSTANT d2 [pm/V] OF UPPER PORTION OF PIEZOELECTRIC LAYER | d1/d2 | DEFORMATION EFFICIENCY RATIO (BASED ON d1 = d2) |
|---|---|---|---|---|---|---|---|---|---|
| | MEMBER | DISTANCE FROM FIRST ELECTRODE [nm] | | | | | | | |
| 1 | PIEZOELECTRIC LAYER | 115 | 1200 | 100 | 8% | 10 | 200 | 5.0% | 1.036 |
| 2 | PIEZOELECTRIC LAYER | 115 | 1200 | 100 | 8% | 25 | 200 | 12.5% | 1.015 |
| 3 | PIEZOELECTRIC LAYER | 115 | 1200 | 100 | 8% | 50 | 200 | 25.0% | 1.013 |
| 4 | PIEZOELECTRIC LAYER | 115 | 1200 | 100 | 8% | 75 | 200 | 37.5% | 1.011 |
| 5 | PIEZOELECTRIC LAYER | 115 | 1200 | 100 | 8% | 100 | 200 | 50.0% | 1.009 |
| 6 | PIEZOELECTRIC LAYER | 115 | 1200 | 100 | 8% | 125 | 200 | 62.5% | 1.007 |
| 7 | PIEZOELECTRIC LAYER | 115 | 1200 | 100 | 8% | 150 | 200 | 75.0% | 1.004 |
| 8 | PIEZOELECTRIC LAYER | 115 | 1200 | 100 | 8% | 175 | 200 | 87.5% | 1.002 |
| 9 | PIEZOELECTRIC LAYER | 115 | 1200 | 100 | 8% | 200 | 200 | 100.0% | 1.000 |
| 10 | DIAPHRAGM | -275 | 1200 | 100 | 8% | 10 | 200 | 5.0% | 0.936 |
| 11 | DIAPHRAGM | -275 | 1200 | 100 | 8% | 25 | 200 | 12.5% | 0.988 |
| 12 | DIAPHRAGM | -275 | 1200 | 100 | 8% | 50 | 200 | 25.0% | 0.989 |
| 13 | DIAPHRAGM | -275 | 1200 | 100 | 8% | 75 | 200 | 37.5% | 0.991 |
| 14 | DIAPHRAGM | -275 | 1200 | 100 | 8% | 100 | 200 | 50.0% | 0.993 |
| 15 | DIAPHRAGM | -275 | 1200 | 100 | 8% | 125 | 200 | 62.5% | 0.995 |
| 16 | DIAPHRAGM | -275 | 1200 | 100 | 8% | 150 | 200 | 75.0% | 0.997 |
| 17 | DIAPHRAGM | -275 | 1200 | 100 | 8% | 175 | 200 | 87.5% | 0.998 |
| 18 | DIAPHRAGM | -275 | 1200 | 100 | 8% | 200 | 200 | 100.0% | 1.000 |

FIG. 9

| SAMPLE NO. | NEUTRAL PLANE POSITION | | THICKNESS tp [nm] OF PIEZOELECTRIC LAYER | THICKNESS tpb [nm] OF LOWER PORTION OF PIEZOELECTRIC LAYER | tpb/tp | PIEZOELECTRIC CONSTANT d1 [pm/V] OF LOWER PORTION OF PIEZOELECTRIC LAYER | PIEZOELECTRIC CONSTANT d2 [pm/V] OF UPPER PORTION OF PIEZOELECTRIC LAYER | d1/d2 | DEFORMATION EFFICIENCY RATIO (BASED ON d1=d2) |
|---|---|---|---|---|---|---|---|---|---|
| | MEMBER | DISTANCE FROM FIRST ELECTRODE [nm] | | | | | | | |
| 19 | PIEZOELECTRIC LAYER | 115 | 1200 | 0 | 0% | 10 | 200 | 5.0% | 1.000 |
| 20 | PIEZOELECTRIC LAYER | 115 | 1200 | 200 | 17% | 10 | 200 | 5.0% | 1.032 |
| 21 | PIEZOELECTRIC LAYER | 115 | 1200 | 300 | 25% | 10 | 200 | 5.0% | 1.037 |
| 22 | PIEZOELECTRIC LAYER | 115 | 1200 | 400 | 33% | 10 | 200 | 5.0% | 1.023 |
| 23 | PIEZOELECTRIC LAYER | 115 | 1200 | 600 | 50% | 10 | 200 | 5.0% | 0.949 |
| 24 | PIEZOELECTRIC LAYER | 115 | 1200 | 800 | 67% | 10 | 200 | 5.0% | 0.792 |
| 25 | PIEZOELECTRIC LAYER | 115 | 1200 | 1000 | 83% | 10 | 200 | 5.0% | 0.520 |
| 26 | PIEZOELECTRIC LAYER | 115 | 1200 | 1200 | 100% | 10 | 200 | 5.0% | 0.073 |
| 27 | DIAPHRAGM | -275 | 1200 | 0 | 0% | 10 | 200 | 5.0% | 1.000 |
| 28 | DIAPHRAGM | -275 | 1200 | 200 | 17% | 10 | 200 | 5.0% | 0.959 |
| 29 | DIAPHRAGM | -275 | 1200 | 300 | 25% | 10 | 200 | 5.0% | 0.935 |
| 30 | DIAPHRAGM | -275 | 1200 | 400 | 33% | 10 | 200 | 5.0% | 0.889 |
| 31 | DIAPHRAGM | -275 | 1200 | 600 | 50% | 10 | 200 | 5.0% | 0.756 |
| 32 | DIAPHRAGM | -275 | 1200 | 800 | 67% | 10 | 200 | 5.0% | 0.582 |
| 33 | DIAPHRAGM | -275 | 1200 | 1000 | 83% | 10 | 200 | 5.0% | 0.360 |
| 34 | DIAPHRAGM | -275 | 1200 | 1200 | 100% | 10 | 200 | 5.0% | 0.059 |

LIQUID EJECTING HEAD AND LIQUID EJECTING APPARATUS

The present application is based on, and claims priority from JP Application Serial Number 2023-030797, filed Mar. 1, 2023, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head used in a liquid ejecting apparatus, typically, a piezoelectric ink-jet printer, includes a diaphragm constituting a part of a wall surface of pressure compartments communicating with nozzles, from which liquid such as ink is ejected, and piezoelectric elements configured to cause the diaphragm to vibrate, as disclosed in, for example, JP-A-2022-116604.

In JP-A-2022-116604, the diaphragm includes a thick portion at a first region corresponding to an end portion of the pressure compartment and includes a thin portion, which is thinner than the thick portion, at a second region corresponding to a center portion of the pressure compartment, and a neutral axis is thereby set at an appropriate position in each of the first region and the second region of the diaphragm. This increases an amount of displacement of the diaphragm caused by being driven by the piezoelectric element.

However, in related art, reducing the thickness of the diaphragm in an attempt to apply the technique disclosed in JP-A-2022-116604 results in that a neutral plane is located inside a piezoelectric layer. In related art, since the piezoelectric layer of the piezoelectric element has a uniform piezoelectric constant in a thickness direction, when the neutral plane is located inside the piezoelectric layer, it could happen that the efficiency of displacement of the diaphragm caused by being driven by the piezoelectric element decreases.

SUMMARY

A liquid ejecting head according to a certain aspect of the present disclosure includes: a piezoelectric element including a first electrode, a piezoelectric layer, and a second electrode; a pressure compartment substrate in which a pressure compartment is provided; and a diaphragm that applies pressure to liquid in the pressure compartment by vibrating by being driven by the piezoelectric element. The pressure compartment substrate, the diaphragm, and the piezoelectric element are stacked in this order in a stacking direction. A neutral plane of a stacked body made up of the piezoelectric element and the diaphragm is located inside the piezoelectric layer. Of two regions obtained by dividing the piezoelectric layer with respect to the neutral plane, a region located closer to the diaphragm is defined as a lower region, and a region located farther from the diaphragm is defined as an upper region. A piezoelectric constant of the lower region is less than a piezoelectric constant of the upper region.

A liquid ejecting head according to another aspect of the present disclosure includes: a piezoelectric element including a first electrode, a piezoelectric layer, and a second electrode; a pressure compartment substrate in which a pressure compartment is provided; and a diaphragm that applies pressure to liquid in the pressure compartment by vibrating by being driven by the piezoelectric element, wherein the pressure compartment substrate, the diaphragm, and the piezoelectric element are stacked in this order in a stacking direction, a neutral plane of a stacked body made up of the piezoelectric element and the diaphragm is located inside the piezoelectric layer, the piezoelectric layer includes a first piezoelectric layer made of crystal with preferred orientation on a plane other than a (100) plane, and a second piezoelectric layer made of crystal with preferred orientation on the (100) plane, the first piezoelectric layer is located between the diaphragm and the neutral plane, and the neutral plane is located between the first piezoelectric layer and the second piezoelectric layer.

A liquid ejecting apparatus according to a certain aspect of the present disclosure includes: the liquid ejecting head according to the above aspect; and a controller that controls driving of the liquid ejecting head.

BRIEF DESCRIPTION OF THE DRAWINGS

FIG. 7 is a diagram illustrating a relationship between the conditions of samples Nos. 1 to 18, with the piezoelectric constant of the lower portion of a piezoelectric layer varied, and the deformation efficiency ratio of the stacked body.

FIG. 9 is a diagram illustrating a relationship between the conditions of samples Nos. 19 to 34, with the thickness of the lower portion of the piezoelectric layer varied, and the deformation efficiency ratio of the stacked body.

DESCRIPTION OF EMBODIMENTS

Figure 1:
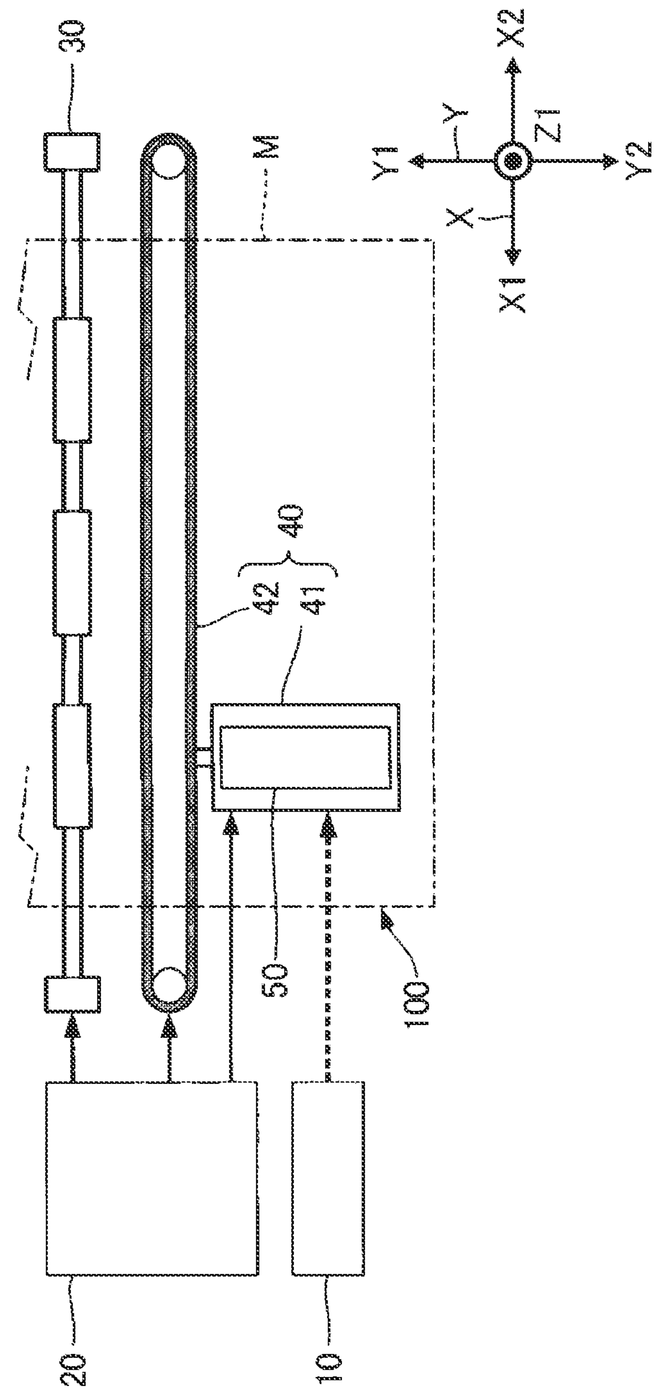
FIG. 1 is a configuration diagram that schematically illustrates a liquid ejecting apparatus according to an embodiment.

With reference to the accompanying drawings, some preferred embodiments of the present disclosure will now be described. The dimensions and scales of components illustrated in the drawings may be different from actual dimensions and scales, and some components may be schematically illustrated for easier understanding. The scope of the present disclosure shall not be construed to be limited to the specific embodiments described below unless and except where the description contains an explicit mention of an intent to limit the present disclosure.

The description below is given with reference to X, Y, and Z axes intersecting with one another. In the description below, one direction along the X axis will be referred to as an X1 direction, and the direction that is the opposite of the X1 direction will be referred to as an X2 direction. Similarly, directions that are the opposite of each other along the Y axis will be referred to as Y1 and Y2 directions. Directions that are the opposite of each other along the Z axis will be referred to as Z1 and Z2 directions. The Z1 direction is an example of a "stacking direction". View in the direction along the Z axis may be referred to as "plan view".

Typically, the Z axis is a vertical axis, and the Z2 direction corresponds to a vertically downward direction. However, the Z axis does not necessarily have to be a vertical axis. The X, Y, and Z axes are typically orthogonal to one another, but are not limited thereto. It is sufficient as long as the X, Y, and Z axes intersect with one another within an angular range of, for example, 80° or greater and 100° or less.

1. Embodiment

1-1. Overall Configuration of Liquid Ejecting Apparatus

FIG. 1 is a configuration diagram that schematically illustrates a liquid ejecting apparatus 100 according to an embodiment. The liquid ejecting apparatus 100 is an ink-jet-type printing apparatus that ejects droplets of ink, which is an example of a liquid, onto a medium M. A typical example of the medium M is printing paper. The medium M is not limited to printing paper. The medium M may be a print target made of any material such as, for example, a resin film or a cloth.

As illustrated in FIG. 1, the liquid ejecting apparatus 100 includes a liquid container (s) 10, a control unit 20, which is an example of "controller", a transport mechanism 30, a movement mechanism 40, and a liquid ejecting head 50.

The liquid container 10 is a container that contains ink. Some specific examples of the liquid container 10 are: a cartridge that can be detachably attached to the liquid ejecting apparatus 100, a bag-type ink pack made of a flexible film material, an ink tank which can be refilled with ink, etc. The type of ink contained in the liquid container 10 is not specifically limited. Any type of ink may be contained therein.

The control unit 20 includes a processing circuit, for example, a CPU (central processing unit) or an FPGA (field programmable gate array), and a storage circuit such as a semiconductor memory, etc. The control unit 20 controls the operation of components of the liquid ejecting apparatus 100. The control unit 20 controls the driving of the liquid ejecting head 50. As will be described later, the liquid ejecting head 50 has excellent ejecting characteristics and, therefore, it is possible to provide the liquid ejecting apparatus 100 that offers excellent ejecting characteristics.

The transport mechanism 30 transports the medium M in the Y2 direction under the control of the control unit 20. The movement mechanism 40 reciprocates the liquid ejecting head 50 in the X1 direction and the X2 direction under the control of the control unit 20. In the example illustrated in FIG. 1, the movement mechanism 40 includes a carriage 41, which has a shape like a box and houses the liquid ejecting head 50, and a transportation belt 42, to which the carriage 41 is fixed. The number of the liquid ejecting head (s) 50 mounted on the carriage 41 is not limited to one. A plurality of liquid ejecting heads may be mounted thereon. In addition to the liquid ejecting head (s) 50, the liquid container (s) 10 mentioned above may be mounted on the carriage 41.

Under the control of the control unit 20, the liquid ejecting head 50 ejects ink supplied from the liquid container 10 toward the medium M2 in the Z2 direction from each of a plurality of nozzles. Ink is ejected concurrently with the transportation of the medium M by the transport mechanism 30 and the reciprocation of the liquid ejecting head 50 by the movement mechanism 40. As a result of this operation, an image is formed using ink on the surface of the medium M. A structure of the liquid ejecting head 50, and a manufacturing method thereof, will be described in detail later.

1-2. Overall Configuration of Liquid Ejecting Head

Figure 2:
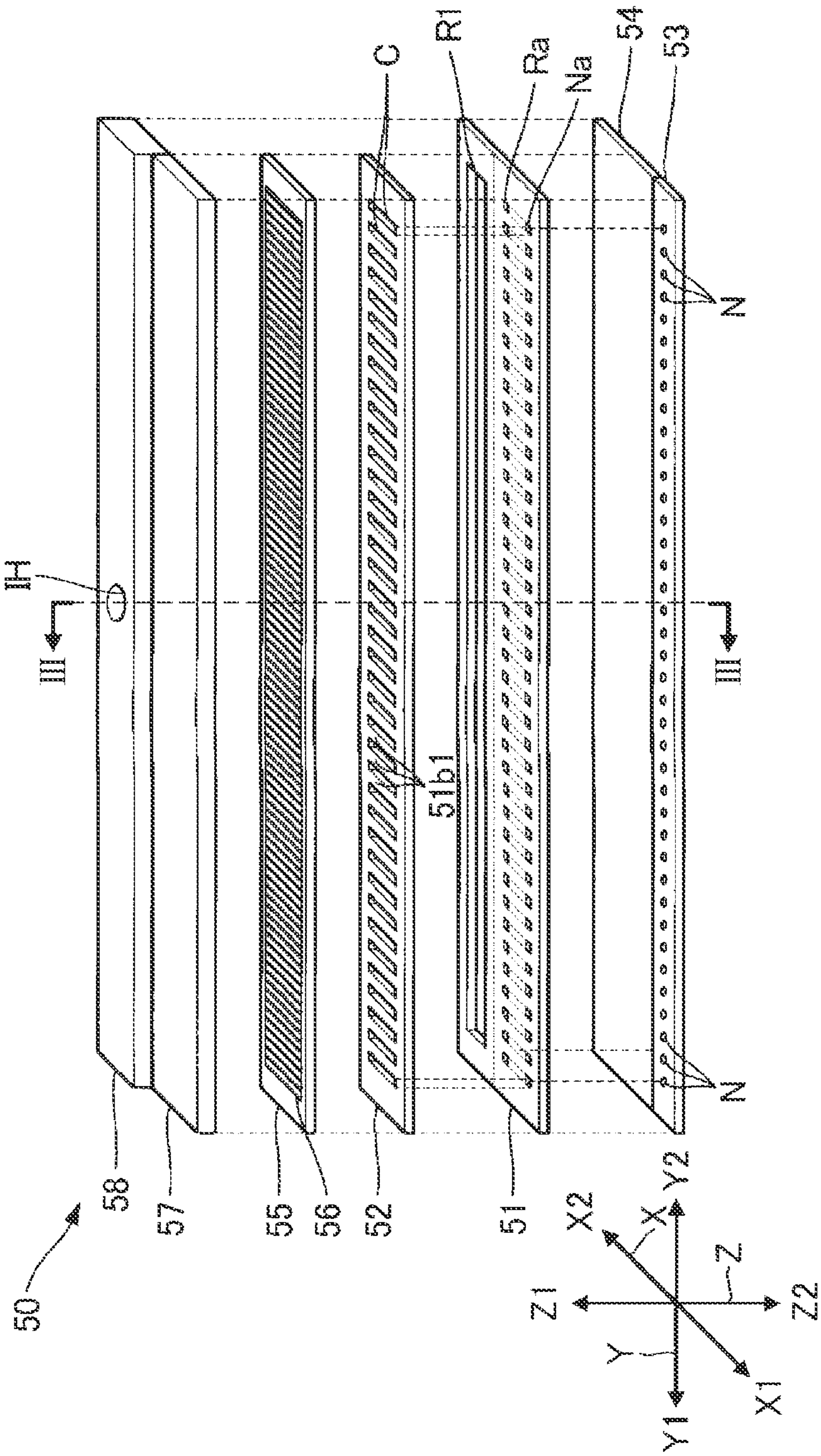
FIG. 2 is an exploded perspective view of a liquid ejecting head according to an embodiment.
Figure 3:
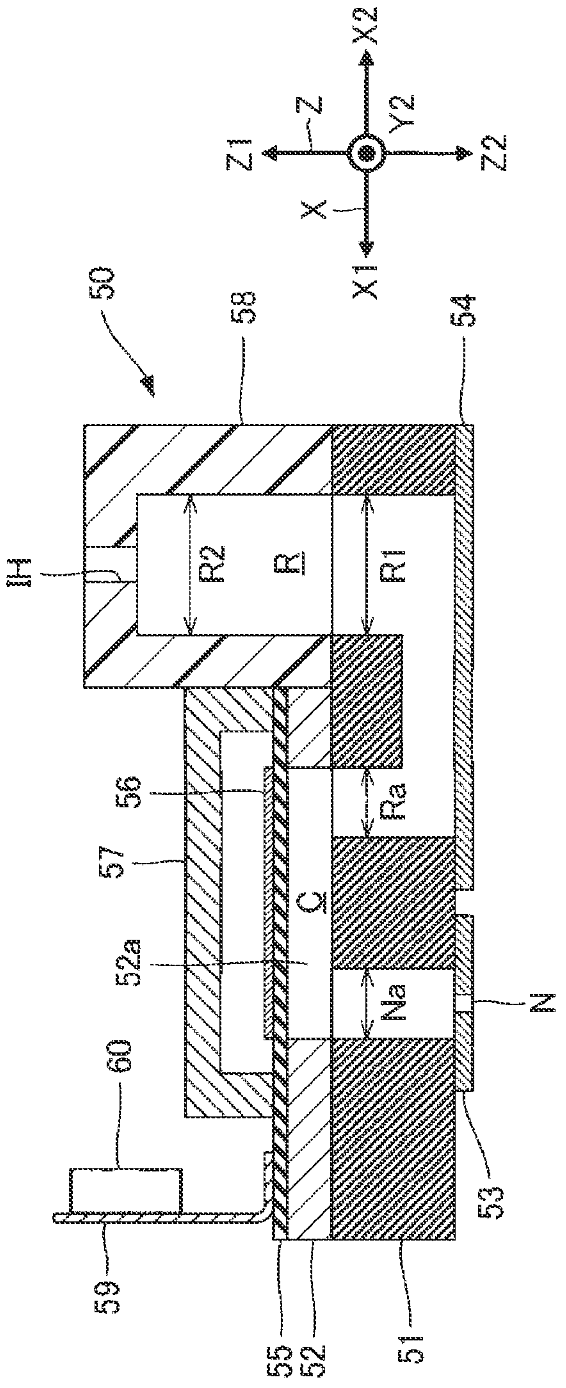
FIG. 3 is a cross-sectional view taken along the line III-III of FIG. 2.

FIG. 2 is an exploded perspective view of the liquid ejecting head 50 according to an embodiment. FIG. 3 is a cross-sectional view taken along the line III-III of FIG. 2. As illustrated in FIGS. 2 and 3, the liquid ejecting head 50 includes a flow passage substrate 51, a pressure compartment substrate 52, a nozzle substrate 53, a dampener 54, a diaphragm 55, a plurality of piezoelectric elements 56, an encapsulating plate 57, a case 58, and a wiring substrate 59.

Among them, the pressure compartment substrate 52, the diaphragm 55, the plurality of piezoelectric elements 56, the case 58, and the encapsulating plate 57 are disposed at regions located at the Z1-directional side with respect to the flow passage substrate 51. On the other hand, the nozzle substrate 53 and the dampener 54 are disposed at regions located at the Z2-directional side with respect to the flow passage substrate 51. Each of the components of the liquid ejecting head 50 is, schematically, a rectangular plate-like member having its longer sides in a direction along the Y axis. These components are bonded to one another by means of, for example, an adhesive.

As illustrated in FIG. 2, the nozzle substrate 53 is a plate-like member in which a plurality of nozzles N arranged in the direction along the Y axis is provided. Each of the nozzles N is a through hole through which ink is allowed to pass. The nozzle substrate 53 is manufactured by processing a monocrystalline silicon substrate by using a semiconductor manufacturing technique such as, for example, dry etching or wet etching, etc. However, any other known method and material may be used as appropriate for manufacturing the nozzle substrate 53.

The flow passage substrate 51 is a plate-like member for forming ink flow passages. As illustrated in FIGS. 2 and 3, an opening portion R1, a plurality of supply flow passages Ra, and a plurality of communication flow passages Na are provided in the flow passage substrate 51. The opening portion R1 is an elongated through hole that extends in the direction along the Y axis in such a way as to be continuous throughout the plurality of nozzles N when viewed in plan in a direction along the Z axis. On the other hand, each of the supply flow passages Ra and the communication flow passages Na is a through hole that is provided individually for each of the nozzles N. Each of the plurality of supply flow passages Ra is in communication with the opening portion R1. Similarly to the nozzle substrate 53 described above, the flow passage substrate 51 is manufactured by, for example, processing a monocrystalline silicon substrate by using a semiconductor manufacturing technique. However, any other known method and material may be used for manufacturing the flow passage substrate 51.

The pressure compartment substrate 52 is a plate-like member in which a plurality of pressure compartments C corresponding to the plurality of nozzles N is formed. Each of the plurality of pressure compartments C is a space that is located between the flow passage substrate 51 and the diaphragm 55 and is called as a cavity for applying pressure to ink with which the inside of this pressure compartment C is filled. The pressure compartments C are arranged in the direction along the Y axis. Each of the plurality of pressure compartments C is configured as a hole 52*a* having respective openings in both surfaces of the pressure compartment substrate 52. Each of the plurality of pressure compartments C has an elongated shape extending in a direction along the X axis. The X2-side end of each of the plurality of pressure compartments C is in communication with the corresponding one of the plurality of supply flow passages Ra. On the other hand, the X1-side end of each of the plurality of pressure compartments C is in communication with the corresponding one of the plurality of communication flow passages Na. Similarly to the nozzle substrate 53 described above, the pressure compartment substrate 52 is manufactured by, for example, processing a monocrystalline silicon substrate by using a semiconductor manufacturing technique. However, any other known method and material may be used for manufacturing each compartment of the pressure compartment substrate 52.

The diaphragm 55 is disposed on the Z1-side surface of the pressure compartment substrate 52. The diaphragm 55 is a plate-like member that is elastically deformable. The diaphragm 55 will be described in detail later with reference to FIG. 5.

The plurality of piezoelectric elements 56 corresponding to the nozzles N or the pressure compartments C different from one another is provided on the Z1-side surface of the diaphragm 55. Each of the plurality of piezoelectric elements 56 is a passive element that deforms by receiving supply of a drive signal. Each of the plurality of piezoelectric elements 56 has an elongated shape extending in the direction along the X axis. The plural piezoelectric elements 56 are arranged in the direction along the Y axis in such a way as to correspond to the plural pressure compartments C respectively. The diaphragm 55 vibrates by being driven by the deformation of the piezoelectric element 56. The vibration causes a change in pressure inside the pressure compartment C. Due to the change in pressure, ink is ejected from the nozzle N. The piezoelectric element 56 will be described in detail later with reference to FIGS. 4 and 5.

The case 58 is a case for pooling ink that is to be supplied to the plurality of pressure compartments C. The case 58 is bonded to the Z1-side surface of the flow passage substrate 51 by means of an adhesive, etc. The case 58 is, for example, made of a resin material and is manufactured by injection molding. The case 58 has a containing portion R2 and an inlet IH. The containing portion R2 is a recess having a shape corresponding to the shape of the opening portion R1 of the flow passage substrate 51. The inlet IH is a through hole that is in communication with the containing portion R2. The space formed by the opening portion R1 and the containing portion R2 serves as a liquid pooling space R, which is a reservoir for pooling ink. Ink supplied from the liquid container 10 flows into the liquid pooling space R via the inlet IH.

The dampener 54 is a component that absorbs changes in pressure inside the liquid pooling space R. The dampener 54 is, for example, a compliance substrate that is a flexible sheet member having elastic deformability. The dampener 54 is disposed on the Z2-side surface of the flow passage substrate 51 in such a way as to constitute the bottom of the liquid pooling space R by closing the opening portion R1 of the flow passage substrate 51 and the plurality of supply flow passages Ra thereof.

The encapsulating plate 57 is a structural member that protects the plurality of piezoelectric elements 56 and reinforces the mechanical strength of the pressure compartment substrate 52 and the diaphragm 55. The encapsulating plate 57 is bonded to the surface of the diaphragm 55 by means of, for example, an adhesive. The encapsulating plate 57 has a recess for housing the plurality of piezoelectric elements 56.

The wiring substrate 59 is bonded to the Z1-side surface of the pressure compartment substrate 52 or the diaphragm 55. The wiring substrate 59 is a component on which a plurality of wires for electric coupling between the control unit 20 and the liquid ejecting head 50 is formed. The wiring substrate 59 is a flexible wiring board such as, for example, an FPC (Flexible Printed Circuit) or an FFC (Flexible Flat Cable). A drive circuit 60 for driving the piezoelectric elements 56 is mounted on the wiring substrate 59. The drive circuit 60 selectively supplies a drive signal for driving each of the plurality of piezoelectric elements 56 to the each of the plurality of piezoelectric elements 56 via the wiring substrate 59.

As described above, the liquid ejecting head 50 includes the piezoelectric elements 56, the pressure compartment substrate 52 in which the pressure compartments C communicating with the nozzles N are provided, and the diaphragm 55 that applies pressure to liquid in the pressure compartments C by vibrating by being driven by the piezoelectric elements 56. As described earlier, the pressure compartment substrate 52, the diaphragm 55, and the piezoelectric elements 56 are stacked in this order in the Z1 direction.

1-3. Details on Diaphragm and Piezoelectric Element

Figure 4:
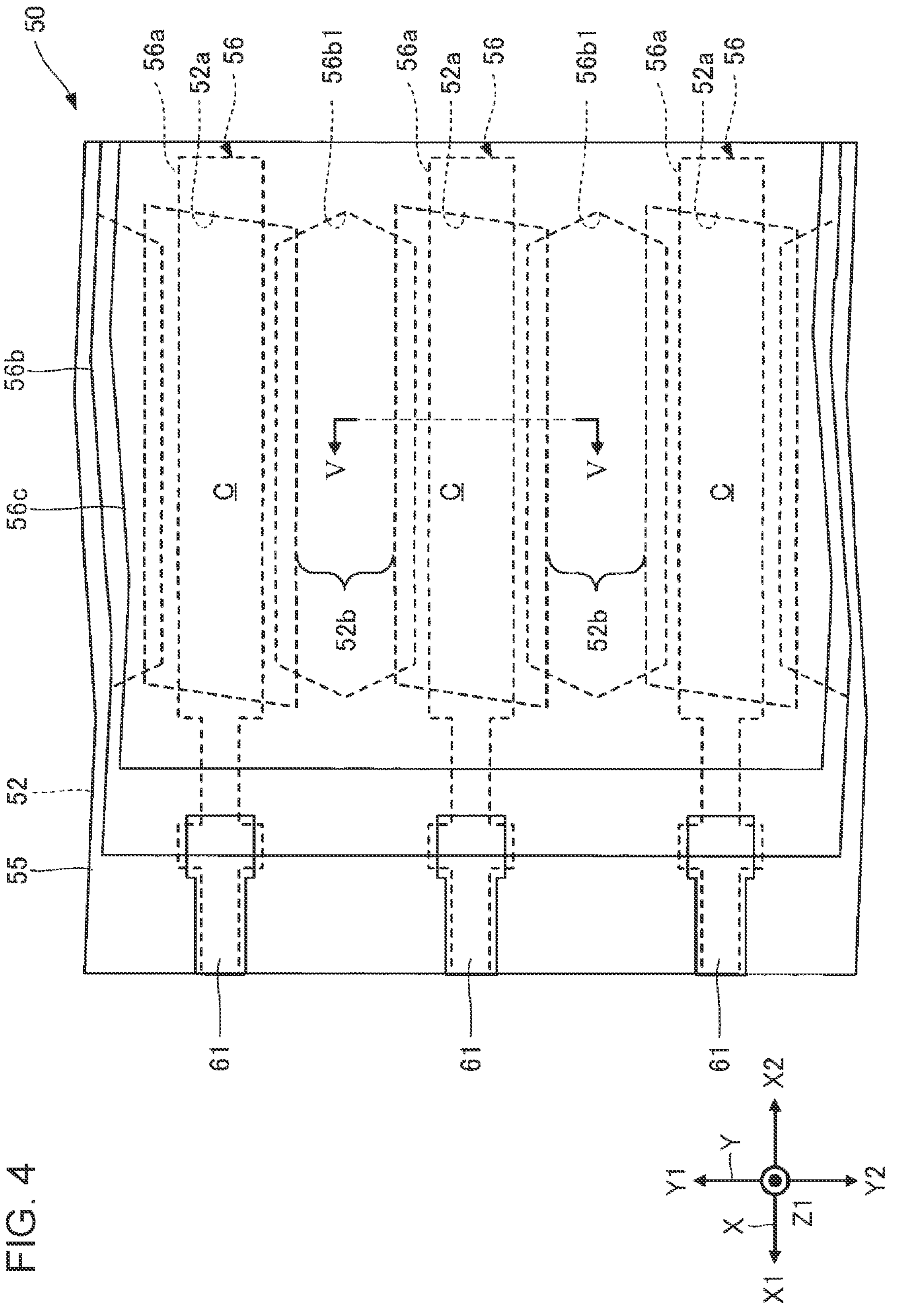
FIG. 4 is a plan view of a part of the liquid ejecting head according to an embodiment.
Figure 5:
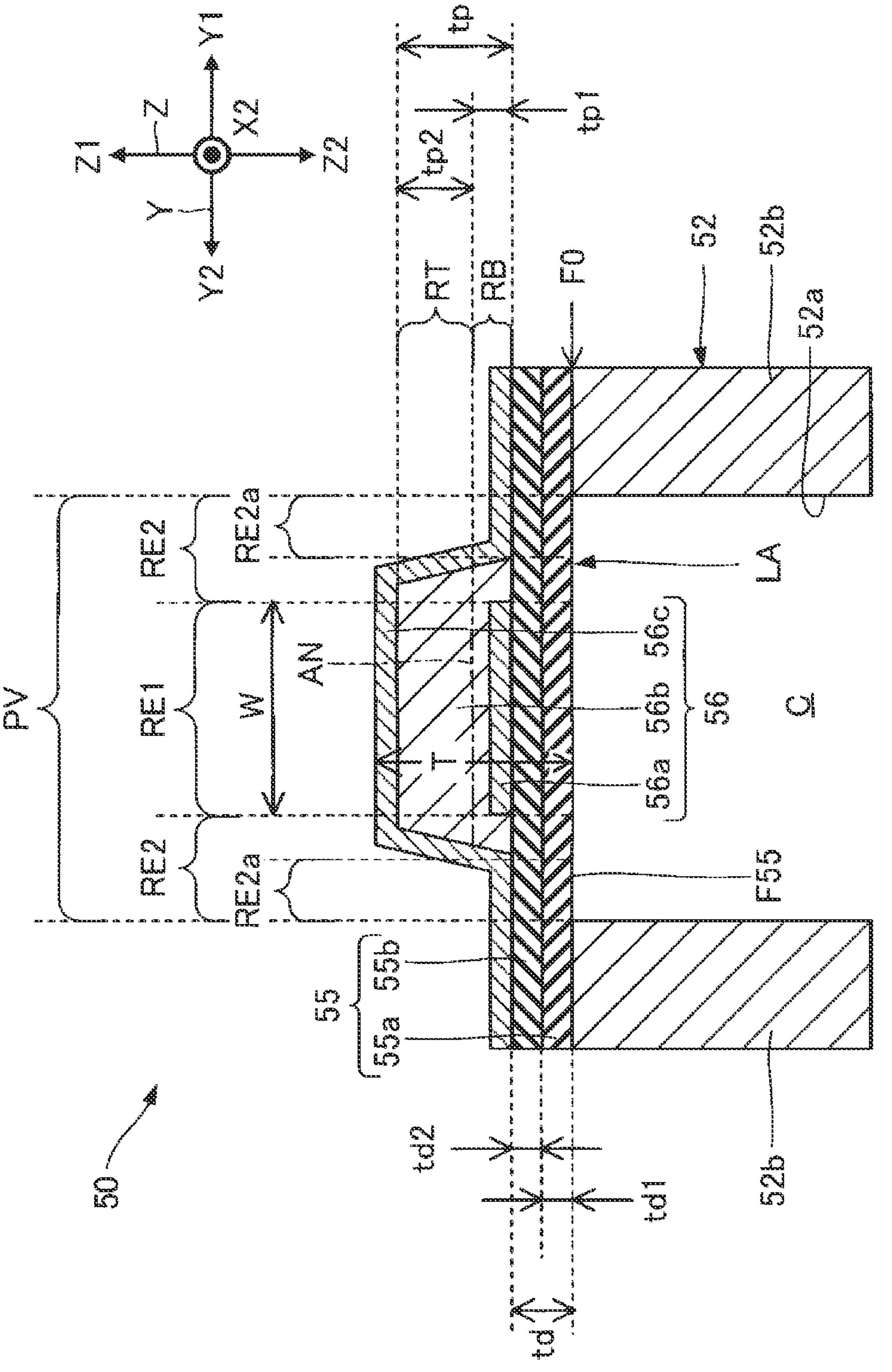
FIG. 5 is a cross-sectional view taken along the line V-V of FIG. 4.

FIG. 4 is a plan view of a part of the liquid ejecting head 50 according to an embodiment. FIG. 5 is a cross-sectional view taken along the line V-V of FIG. 4. With reference to FIGS. 4 and 5, the pressure compartment substrate 52, the piezoelectric element 56, and the diaphragm 55 will be described below in this order.

As illustrated in FIGS. 4 and 5, holes 52*a* that constitute the pressure compartments C are provided in the pressure compartment substrate 52. In the pressure compartment substrate 52, a partition wall 52*b* extending in the direction along the X axis is provided each between two holes 52*a* located next to each other. The pressure compartment substrate 52 is manufactured by, for example, processing a monocrystalline silicon substrate by using a semiconductor manufacturing technique. In FIG. 4, the shape of the hole 52*a* in a plan view, when formed in a monocrystalline silicon substrate having crystal face orientation (110) by using anisotropic etching, is indicated by broken-line illustration. The shape of the hole 52*a* in a plan view is not limited to the example illustrated in FIG. 4. The hole 52*a* may have any shape in a plan view.

The pressure compartments C are formed after the forming of the piezoelectric elements 56. For example, the pressure compartments C are formed by performing anisotropic etching of, of the two surfaces of the monocrystalline silicon substrate after the forming of the piezoelectric elements 56, a surface that is not a surface on which the piezoelectric elements 56 have been formed. In this process, for example, a potassium hydroxide solution (KOH) or the like is used as an etchant for the anisotropic etching. In addition, in this process, when an elastic film 55*a* is made of silicon oxide, the elastic film 55*a* functions as a stopper layer that stops the anisotropic etching. After the forming of the pressure compartments C described above, the flow passage substrate 51 and the like are bonded to the pressure compartment substrate 52 by means of an adhesive.

As illustrated in FIG. 4, in a plan view, the piezoelectric elements 56 overlap with the pressure compartments C. As illustrated in FIG. 5, the piezoelectric element 56 includes a first electrode 56*a*, a piezoelectric layer 56*b*, and a second electrode 56*c*. The first electrode 56*a*, the piezoelectric layer 56*b*, and the second electrode 56*c* are stacked in this order in the Z1 direction.

The first electrode 56*a* is an individual electrode. The individual electrodes are disposed apart from one another to correspond individually to the piezoelectric elements 56. Specifically, plural first electrodes 56*a* each extending in the direction along the X axis are arranged in the direction along the Y axis at intervals from one another. A drive signal that includes a predetermined voltage pulse is supplied from the control unit 20 to the first electrode 56*a* of each of the plurality of piezoelectric elements 56.

The first electrode 56*a* includes, for example, a layer made of iridium (ir) and a layer made of titanium (Ti). These layers are stacked in this order in the Z1 direction. Iridium is an electrode material having excellent conductivity. Therefore, using iridium as a material of the first electrode 56*a* makes it possible to achieve a low resistance of the first electrode 56*a*. Moreover, in the layer made of titanium, when the piezoelectric layer 56*b* is formed, island-shaped Ti functions as a crystal nucleus to control the orientation of the piezoelectric layer 56*b* and thus enhance the crystallinity or orientation of the piezoelectric layer 56*b*.

In place of or in addition to the layer made of iridium, a layer made of any other metal material may be provided. Examples of the other metal material include platinum (Pt), aluminum (Al), nickel (Ni), gold (Au), copper (Cu), and the like. Any one of those enumerated here may be used alone, or two or more of them may be used in combination. The material of the first electrode 56*a* is not limited to a metal material. For example, conductive metal oxide such as ITO (Indium Tin Oxide), IZO (Indium Zinc Oxide), etc. may be used.

In the example illustrated in FIGS. 4 and 5, the piezoelectric layer 56*b* has a band-like shape extending in the direction along the Y axis continuously throughout the plurality of piezoelectric elements 56. In the example illustrated in FIG. 4, a through hole 56*b*1 going through the piezoelectric layer 56*b* is provided in the piezoelectric layer 56*b* in such a way as to extend in the direction along the X axis at each area corresponding in a plan view to a gap between the pressure compartments C located next to each other. Therefore, in a cross-sectional view illustrated in FIG. 5, the piezoelectric layer 56*b* is provided individually for each of the plurality of piezoelectric elements 56. In the example illustrated in FIG. 4, at a portion where no through hole 56*b*1 is provided, the piezoelectric layer 56*b* is provided continuously for the plurality of pressure compartments C. However, this structure does not imply any limitation. The continuous portion may be removed, and the piezoelectric layer 56*b* may be provided with individual separation for each of the plurality of piezoelectric elements 56.

The piezoelectric layer 56*b* is made of a piezoelectric material that has a perovskite-type crystal structure that is represented by a general composition formula $ABO_3$. Examples of such a piezoelectric material include, for example, lead titanate ($PbTiO_3$), lead zirconate titanate ($Pb(Zr, Ti)O_3$), lead zirconate ($PbZrO_3$), lead lanthanum titanate ($(Pb, La), TiO_3$), lead lanthanum zirconate titanate ($(Pb, La) (Zr, Ti)O_3$), lead niobate zirconate titanate ($Pb(Zr, Ti, Nb)O_3$), lead magnesium niobate zirconate titanate ($Pb (Zr, Ti) (Mg, Nb)O_3$), and the like. Among others, lead zirconate titanate, potassium sodium niobate, barium titanate may be preferably used as the material of the piezoelectric layer 56*b* because it is easier to enhance piezoelectric performance with this material.

The piezoelectric layer 56*b* may have a single-layer structure, or a stacked structure made up of a plurality of layers as will be described later with reference to FIG. 6. However, when the piezoelectric layer 56*b* has a stacked structure made up of a plurality of layers, there is an advantage in that it is easier to make the piezoelectric constant of the piezoelectric layer 56*b* different in a thickness direction, as will be described later.

The second electrode 56*c* is a band-like common electrode extending in the direction along the Y axis continuously throughout the plurality of piezoelectric elements 56. A predetermined constant potential is supplied to the second electrode 56*c*.

The second electrode 56*c* is made of, for example, iridium (ir). However, the material of the second electrode 56*c* is not limited to iridium. For example, a metal material such as platinum (Pt), aluminum (Al), nickel (Ni), gold (Au), copper (Cu), or the like may be used. Any one of these kinds of a metal material may be used alone, or two or more of them may be used in combination in a layer-stacked manner or the like for the second electrode 56*c*.

The first electrode 56*a*, the piezoelectric layer 56*b*, and the second electrode 56*c* described above are obtained through film deposition on the diaphragm 55 in this order. Each of the first electrode 56*a* and the second electrode 56*c* is formed using, for example, a known film deposition technique such as sputtering and a known processing technique using photolithography and etching, etc. The piezoelectric layer 56*b* is formed by, for example, forming a precursor layer of a piezoelectric body using a sol-gel method and then by sintering the precursor layer for crystallization. In addition, the piezoelectric layer 56*b* is polarized by applying a voltage between the first electrode 56*a* and the second electrode 56*c*.

In the piezoelectric element 56 described above, the piezoelectric layer 56*b* deforms due to an inverse piezoelectric effect when a voltage is applied between the first electrode 56*a* and the second electrode 56*c*. This deformation causes the diaphragm 55 to vibrate.

As illustrated in FIG. 5, the diaphragm 55 includes an elastic film 55*a* and an insulating film 55*b*. The elastic film 55*a* and the insulating film 55*b* are stacked in this order in the Z1 direction. The elastic film 55*a* is provided on the pressure compartment substrate 52. The insulating film 55*b* is provided between the elastic film 55*a* and the piezoelectric elements 56.

In FIG. 5, for convenience of explanation, an interface between the layers constituting the diaphragm 55 is clearly illustrated. However, the interface may be ambiguous. For example, in the neighborhood of two layers located adjacent to each other, the constituent materials of the two layers may exist in a mixed manner. The structure of the diaphragm 55 is not limited to the above-described structure including the elastic film 55*a* and the insulating film 55*b*. For example, the insulating film 55*b* may be omitted, or a film made of $TiO_x$, $AlO_x$, $Cro_x$, TiN for enhancing adhesion may be provided between the elastic film 55*a* and the insulating film 55*b*.

The elastic film 55*a* is a film made of, for example, silicon oxide ($SiO_2$). Besides silicon oxide and its constituent elements, the elastic film 55*a* may contain, as impurities, a small amount of any other element such as zirconium (Zr), titanium (Ti), iron (Fe), chromium (Cr), hafnium (Hf), or the like. Such impurities have an effect of softening silicon oxide ($SiO_2$). The impurities may be an element that gets mixed in unavoidably in the process of forming the elastic film 55*a* or an element that is mixed into the elastic film 55*a* intentionally. In the elastic film 55*a*, silicon may exist in a state of oxide, or silicon may exist alone, in a state of nitride, in a state of oxy-nitride, or the like.

A thickness td1 of the elastic film 55*a* is determined depending on a thickness td and a width, etc. of the diaphragm 55. It is preferable if the thickness td1, though not specifically limited, is within a range from 100 nm inclusive to 2000 nm inclusive, or more preferably, within a range from 500 nm inclusive to 1500 nm inclusive. The insulating film 55*b* is a film made of, for example, zirconium oxide ($ZrO_2$). Besides zirconium oxide and its constituent elements, the insulating film 55*b* may contain, as impurities, a small amount of any other element such as titanium (Ti), iron (Fe), chromium (Cr), hafnium (Hf), or the like. Such impurities have an effect of softening zirconium oxide ($ZrO_2$). The impurities may be an element that gets mixed in unavoidably in the process of forming the insulating film 55*b* or an element that is mixed into the insulating film 55*b* intentionally. In the insulating film 55*b*, zirconium may exist in a state of oxide, or zirconium may exist alone, in a state of nitride, in a state of oxy-nitride, or the like.

The material of the insulating film 55*b* is not limited to $ZrO_2$. For example, it may be $PbTiO_x$, $TiO_x$, or ((Pb, Bi) (Fe, Ti) $O_x$). The insulating film 55*b* may have a single-layer structure, or a stacked structure made up of a plurality of layers.

A thickness td2 of the insulating film 55*b* is determined depending on the thickness td and the width, etc. of the diaphragm 55. It is preferable if the thickness td2, though not specifically limited, for example, is within a range from 100 nm inclusive to 2000 nm inclusive, or more preferably, within a range from 500 nm inclusive to 1500 nm inclusive.

The elastic film 55*a* and the insulating film 55*b* described above can be obtained by performing film forming in this order on the monocrystalline silicon substrate for forming the pressure compartment substrate 52. For example, when the elastic film 55*a* is made of silicon oxide, the elastic film 55*a* is formed by thermally oxidizing one surface of the monocrystalline silicon substrate. For example, when the insulating film 55*b* is made of zirconium oxide, the insulating film 55*b* is formed by forming a zirconium layer on the elastic film 55*a* by using a sputtering method and then thermally oxidizing the zirconium layer.

The method for forming each of the plurality of films making up the diaphragm 55 is not limited to the above example. Any other method may be used. For example, a CVD method or the like may be used for forming at least a part of the elastic film 55*a*. The method for forming the insulating film 55*b* s not limited to the method using thermal oxidation. For example, a CVD method, an atomic layer deposition (ALD) method, or the like may be used.

The diaphragm 55 described above includes a vibration region PV that vibrates by being driven by the piezoelectric element 56. The vibration region PV is a portion, of the diaphragm 55, overlapping with the pressure compartment C in a plan view. Each of the elastic film 55*a* and the insulating film 55*b* described above is provided throughout the entire area of the vibration region PV when viewed in the direction along the Z axis.

The vibration region PV is divided into an active region RE1 and a non-active region RE2. The active region RE1 is a portion, of the diaphragm 55, overlapping with the pressure compartment C, the first electrode 56*a*, the piezoelectric layer 56*b*, and the second electrode 56*c* when viewed in the direction along the Z axis. The non-active region RE2 is a portion, of the diaphragm 55, overlapping with the pressure compartment C when viewed in the direction along the Z axis but being not the active region RE1.

In the example illustrated in FIG. 5, the non-active region RE2 includes an arm portion RE2*a*. The arm portion RE2*a* is a portion, of the diaphragm 55, not overlapping with the piezoelectric layer 56*b* but overlapping with the pressure compartment C, between the active region RE1 and a width-directional end of the pressure compartment C, when viewed in the direction along the Z axis.

Therefore, the ends of the pressure compartment C in its shorter-side direction do not overlap with the piezoelectric layer 56*b* when in the direction along the Z axis. Providing the arm portion RE2*a* described here makes it easier for the width-directional end portion of the diaphragm 55 to deform. Therefore, it is possible to improve the efficiency of deformation of the diaphragm 55 caused by being driven by the piezoelectric element 56.

In order to cause a stacked body LA made up of the piezoelectric element 56 and the diaphragm 55 described above to deform efficiently by being driven by the piezoelectric element 56, in related art, it was believed that a neutral plane of the stacked body LA should preferably be located between the diaphragm 55 and the piezoelectric element 56 because the piezoelectric constant of the piezoelectric layer 56*b* is uniform.

On the other hand, as the pitch of the nozzles N is becoming narrower these days, the width of the diaphragm 55 is decreasing and, therefore, in order to improve the efficiency of deformation of the diaphragm 55 caused by being driven by the piezoelectric element 56, there is a need to reduce the thickness td of the diaphragm 55.

When the thickness td of the diaphragm 55 decreases, as illustrated in FIG. 5, the neutral plane AN of the stacked body LA is located inside the piezoelectric layer 56*b*. The "neutral plane AN" of the stacked body LA mentioned here is, among planes parallel to both the X axis and the Y axis, a plane where neither compressive distortion nor tensile distortion occurs when a bending moment acts on the stacked body LA. A neutral axis of the stacked body LA corresponds to an axial portion intersecting with the neutral plane, of any arbitrary plane parallel to both the X axis and the Z axis. In the present embodiment, since the piezoelectric element 56 deforms in the Z direction and the pressure compartment C is formed in such a way as to have an elongated shape along the X axis, the deformation of the stacked body LA is conspicuous when viewed along the X axis, and the neutral axis is an axis extending in the X direction.

When a first-layer-side surface of a stacked body made up of a plurality of layers the number of which is n is taken as a reference, a position $y_0$ of the neutral plane of this stacked body can be defined by the following formula (1):

$$y_0 = \frac{\sum_{k=1}^{n} E_k \int_{A_k} y_z \cdot dA_k}{\sum_{k=1}^{n} E_k A_k} = \frac{\sum_{k=1}^{n} E_k a \frac{(h_k^2 + 2h_k h_{k-1} + 2h_k h_{k-2} + \ldots)}{2}}{\sum_{k=1}^{n} E_k (h_k a)} \quad (1)$$

In the above formula (1), k denotes an integer that is not less than 1 and not greater than n, $A_k$ denotes a cross-sectional area of the k-th layer, $E_k$ denotes Young's modulus [GPa] of each layer, $h_k$ denotes film thickness [nm] of each layer, and a denotes layer width [μm].

When this stacked body is applied to the stacked body LA, k is 5, the first layer is the elastic film 55*a*, the second layer is the insulating film 55*b*, the third layer is the first electrode 56*a*, the fourth layer is the piezoelectric layer 56*b*, and the fifth layer is the second electrode 56*c*. Therefore, the position $y_0$ is the position of the neutral plane AN with respect to the reference that is the Z2-side surface of the stacked body LA, and the distance to this plane corresponds to the distance between the reference and the position $y_0$. The Young's modulus $E_1$ is the Young's modulus [GPa] of the elastic film 55*a*. The Young's modulus $E_2$ is the Young's modulus [GPa] of the insulating film 55*b*. The Young's modulus $E_5$ is the Young's modulus [GPa] of the first electrode 56*a*. The Young's modulus $E_4$ is the Young's modulus [GPa] of the piezoelectric layer 56*b*. The Young's modulus $E_3$ is the Young's modulus [GPa] of the second electrode 56*c*. The film thickness $h_1$ is the thickness td1 [mm] of the elastic film 55*a*, the film thickness $h_2$ is the thickness td2 [nm] of the insulating film 55*b*, the film thickness $h_3$ is the thickness [nm] of the first electrode 56*a*, the film thickness $h_4$ is the thickness tp [nm] of the piezoelectric layer 56*b*, and the film thickness $h_5$ is the thickness [nm] of the second electrode 56*c*. The cross-sectional area size $A_k$ is the cross-sectional area size of the stacked body LA, and corresponds to the thickness T of the stacked body LA multiplied by the width a. The width a is the width W of the active region RE1.

Of two regions obtained by dividing the piezoelectric layer 56*b* with respect to the neutral plane AN described above, the region located closer to the diaphragm 55 is a lower region RB, and the region located farther from the diaphragm 55 is an upper region RT. That is, the lower region RB is the region of the piezoelectric layer 56*b* located at the Z2-directional side in relation to the neutral plane AN, and the upper region RT is the region of the piezoelectric layer 56*b* located at the Z1-directional side in relation to the neutral plane AN. As described here, the piezoelectric layer 56*b* includes the lower region RB and the upper region RT.

On the side surface of each of the lower region RB and the upper region RT, a part of the second electrode 56*c* of the piezoelectric element 56 is disposed. Since the second electrode 56*c* includes a portion disposed on the side surface of each of the lower region RB and the upper region RT as described here, it is possible to configure the first electrode 56*a* as an individual electrode and configure the second electrode 56*c* as a common electrode as described earlier.

When the neutral plane AN is located inside the piezoelectric layer 56*b* as described above, designing the piezoelectric constant of the piezoelectric layer 56*b* to be substantially uniform in the Z-axis direction could result in a decrease in the efficiency of deformation of the diaphragm 55 caused by being driven by the piezoelectric element 56. The following is the reason why this could happen. When a voltage is applied to the piezoelectric element 56 by means of two electrodes, the piezoelectric element deforms in such a way as to contract substantially along the Y axis due to an inverse piezoelectric effect, and a bending moment is generated in such a way as to render the stacked body LA convex toward the pressure compartment. When the neutral plane AN is located inside the piezoelectric layer 56*b*, the displacement of the piezoelectric layer 56*b* of the upper region RT contributes to the bending moment, whereas the deformation of the piezoelectric layer 56*b* of the lower region RB impedes the bending moment. This is because, at the lower region RB where tensile distortion occurs as the stacked body LA is rendered convex toward the pressure compartment, that is, where a force in an expanding direction is applied, a force in a contracting direction of the piezoelectric layer 56*b* is applied due to an inverse piezoelectric effect. For the reason explained above, in a structure in which the piezoelectric constant of the piezoelectric layer 56*b* is designed to be substantially uniform in the Z-axis direction, a decrease in the efficiency of deformation could occur.

In view of the above, for the purpose of improving the efficiency of deformation of the diaphragm 55 caused by being driven by the piezoelectric element 56, in the liquid ejecting head 50, the piezoelectric constant of the lower region RB is less than the piezoelectric constant of the upper region RT. For this reason, when a voltage is applied to the piezoelectric element 56, the lower region RB is harder to deform due to an inverse piezoelectric effect than the upper region RT. Therefore, the lower region RB functions as the diaphragm 55 in substance and, accordingly, this suppresses the impediment by the deformation of the lower region RB due to the inverse piezoelectric effect to the bending moment of the stacked body LA caused by the deformation of the upper region RT due to the inverse piezoelectric effect. Consequently, even though the neutral plane AN of the stacked body LA is located inside the piezoelectric layer 56*b*, it is possible to improve the efficiency of deformation of the diaphragm 55 caused by being driven by the piezoelectric element 56. Moreover, if the piezoelectric constant of the lower region RB is low to an extent that the lower region RB can be regarded as the diaphragm 55 in substance, a structure equivalent to a structure in which the width-directional end portion of the diaphragm 55 is configured to be thin can be obtained in a pseudo manner and, therefore, a further improvement in the efficiency of deformation can be achieved. With reference to FIGS. 6 to 10, the lower region RB and the upper region RT are described in detail below.

Figure 6:
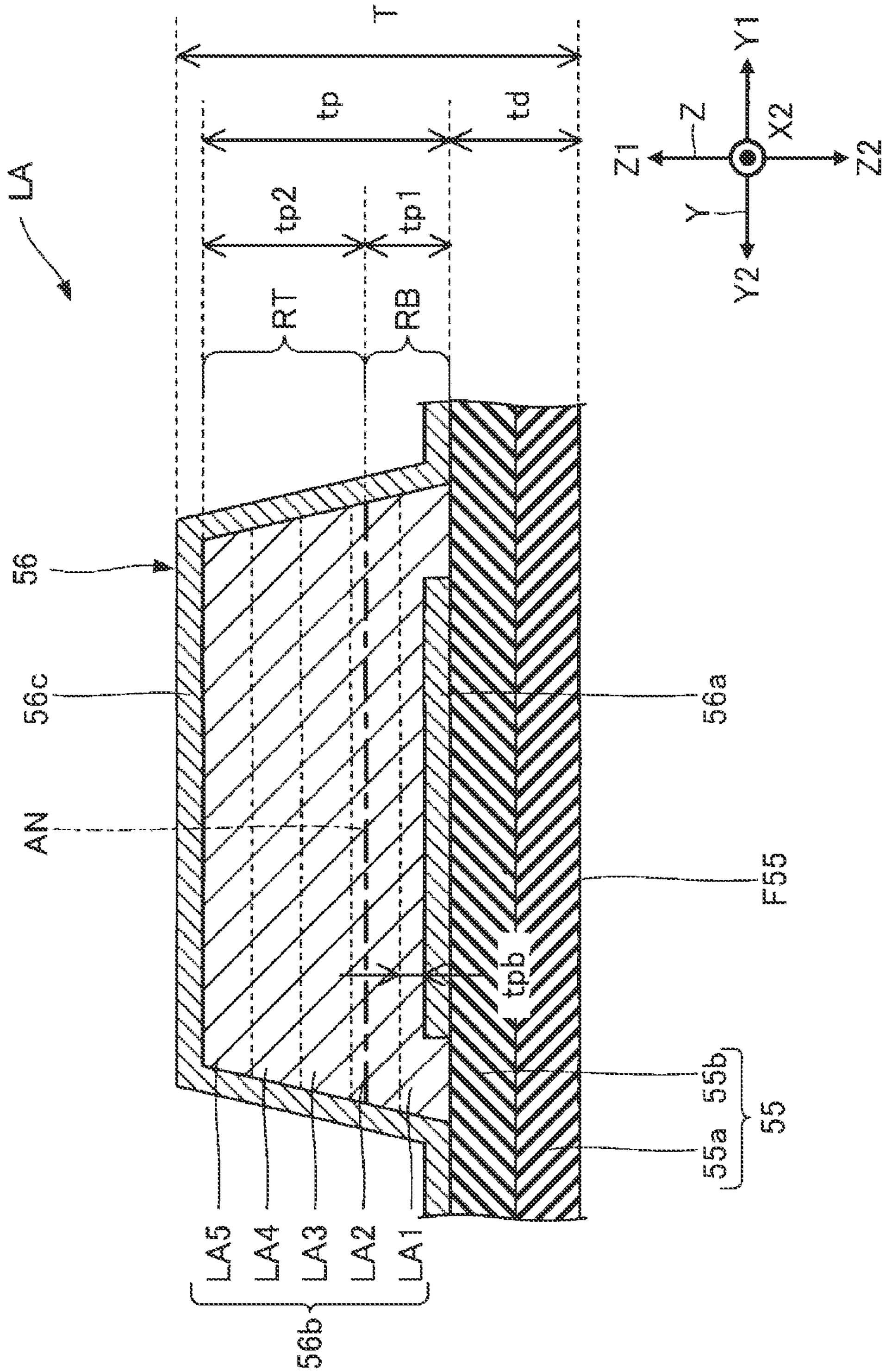
FIG. 6 is a partial enlarged cross-sectional view of a stacked body made up of a piezoelectric element and a diaphragm.

FIG. 6 is a partial enlarged cross-sectional view of the stacked body LA made up of the piezoelectric element 56 and the diaphragm 55. In FIG. 6, for convenience of explanation, a case where the piezoelectric layer 56*b* is a stack of five layers is illustrated as an example. The number of the layers making up the piezoelectric layer 56*b* is not limited to five but may be any number, that is, four or less or six or greater. The plurality of layers making up the piezoelectric layer 56*b* may have an equal thickness or thicknesses different from one another.

As illustrated in FIG. 6, the piezoelectric layer 56*b* includes the plurality of layers LA1, LA2, LA3, LA4, and LA5. The layers LA1, LA2, LA3, LA4, and LA5 are stacked in this order in the Z1 direction. The layer LA1 is an example of a "first piezoelectric layer", is located between the diaphragm 55 and the neutral plane AN, and is included in the lower region RB and is located closest to the diaphragm 55 among the plurality of layers LA1 to LA5. The layer LA5 is an example of a "second piezoelectric layer" and is included in the upper region RT and is located farthest from the diaphragm 55 among the plurality of layers LA1 to LA5. The neutral plane AN is located between the layer LA1 and the layer LA5 described above.

What is needed in order to make the piezoelectric constant of the lower region RB less than the piezoelectric constant of the upper region RT is to make an average of values of the piezoelectric constant of the layers belonging to the lower region RB less than an average of values of the piezoelectric constant of the layers belonging to the upper region RT, among the layers LA1 to LA5. However, from the viewpoint of obtaining a good effect from making the piezoelectric constant of the lower region RB less, it is preferable if the layer LA1, which is located closest to the diaphragm 55 among the layers belonging to the lower region RB, has the least piezoelectric constant. In addition, from the viewpoint of obtaining a good effect from making the piezoelectric constant of the upper region RT greater, it is preferable if the layer LA5, which is located farthest from the diaphragm 55 among the layers belonging to the upper region RT, has the greatest piezoelectric constant.

The thickness of the layer whose piezoelectric constant is made less, and the piezoelectric constant thereof, among the layers of the piezoelectric layer 56*b*, are described in detail below.

FIG. 7 is a diagram illustrating a relationship between the conditions of samples Nos. 1 to 18, with the piezoelectric constant d1 of the lower portion of the piezoelectric layer 56*b* varied, and the deformation efficiency ratio of the stacked body LA. The lower portion of the piezoelectric layer 56*b* is, of two portions obtained by dividing the piezoelectric layer 56*b* in the thickness direction, the portion located closer to the diaphragm 55. In addition, in the description below, of the two portions obtained by dividing the piezoelectric layer 56*b* in the thickness direction, the portion located farther from the diaphragm 55 will be referred to as the upper portion of the piezoelectric layer 56*b*.

"Neutral plane position" in FIG. 7 is the position of the neutral plane AN. In the column whose header is "member", "piezoelectric layer" means that the neutral plane AN is located inside the piezoelectric layer 56*b*, and "diaphragm" means that the neutral plane AN is located inside the diaphragm 55. "Distance from first electrode" is the distance between the first electrode 56*a* and the neutral plane AN [nm]. However, the distance takes a positive value when the neutral plane AN is located at the Z1-directional side with respect to the first electrode 56*a* and takes a negative value when the neutral plane AN is located at the Z2-directional side with respect to the first electrode 56*a*.

In the samples Nos. 1 to 9, the neutral plane AN is located inside the piezoelectric layer 56*b*. In the example illustrated in FIG. 7, the distance between the first electrode 56*a* and the neutral plane AN of the samples Nos. 1 to 9 is 115 nm. By contrast, in the samples Nos. 10 to 18, the neutral plane AN is located inside the diaphragm 55. In the example illustrated in FIG. 7, the distance between the first electrode 56*a* and the neutral plane AN of the samples Nos. 10 to 18 is −275 nm. Note that, in the samples Nos. 10 to 18, the neutral plane AN is located inside the diaphragm 55 because the thickness td of the diaphragm 55 is greater than that of the samples Nos. 1 to 9.

"Thickness of piezoelectric layer" in FIG. 7 is the thickness tp [nm] of the piezoelectric layer 56*b*. "Thickness of lower portion of piezoelectric layer" in FIG. 7 is the thickness tpb [nm] of the lower portion of the piezoelectric layer 56*b*. Moreover, "tpb/tp" in FIG. 7 is a ratio tpb/tp of the thickness tpb to the thickness tp.

The samples Nos. 1 to 18 have the equal thickness tp, the equal thickness tpb, and the equal ratio tpb/tp as one another. In the example illustrated in FIG. 7, the thickness tp is 1200 nm, the thickness tpb is 100 nm, and the ratio tpb/tp is 88. More specifically, twelve layers each having the thickness of 100 nm are stacked to make up the piezoelectric layer 56*b* having the thickness of 1200 nm.

"Piezoelectric constant of lower portion of piezoelectric layer" in FIG. 7 is the piezoelectric constant d1 of the lower portion of the piezoelectric layer 56*b*. "Piezoelectric constant of upper portion of piezoelectric layer" in FIG. 7 is the piezoelectric constant d2 of the upper portion of the piezoelectric layer 56*b*. Moreover, "d1/d2" in FIG. 7 is a ratio d1/d2 of the piezoelectric constant d1 to the piezoelectric constant d2.

The samples Nos. 1 to 18 have the equal piezoelectric constant d2 as one another. In the example illustrated in FIG. 7, the piezoelectric constant d2 of the samples Nos. 1 to 18 is 200 [pm/V]. On the other hand, the values of the piezoelectric constant d1 of the samples Nos. 1 to 9 are different from one another. Similarly, the values of the piezoelectric constant d1 of the samples Nos. 10 to 18 are different from one another. In the example illustrated in FIG. 7, the piezoelectric constant d1 of the samples Nos. 1 and 10 is 10 [pm/V], the piezoelectric constant d1 of the samples Nos. 2 and 11 is 25 [pm/V], the piezoelectric constant d1 of the samples Nos. 3 and 12 is 50 [pm/V], the piezoelectric constant d1 of the samples Nos. 4 and 13 is 75 [pm/V], the piezoelectric constant d1 of the samples Nos. 5 and 14 is 100 [pm/V], the piezoelectric constant d1 of the samples Nos. 6 and 15 is 125 [pm/V], the piezoelectric constant d1 of the samples Nos. 7 and 16 is 150 [pm/V], the piezoelectric constant d1 of the samples Nos. 8 and 17 is 175 [pm/V], and the piezoelectric constant d1 of the samples Nos. 9 and 18 is 200 [pm/V].

"Deformation efficiency ratio" in FIG. 7 is a ratio in terms of deformation efficiency expressed when a case where the piezoelectric constant d1 and the piezoelectric constant d2 are equal to each other is taken as a referential basis "1". The deformation efficiency is, for example, a percentage of a displacement amount of the diaphragm 55 in relation to a voltage applied to the piezoelectric element 56. The results of the deformation efficiency ratio illustrated in FIG. 7 were obtained by running a simulation.

Figure 8:
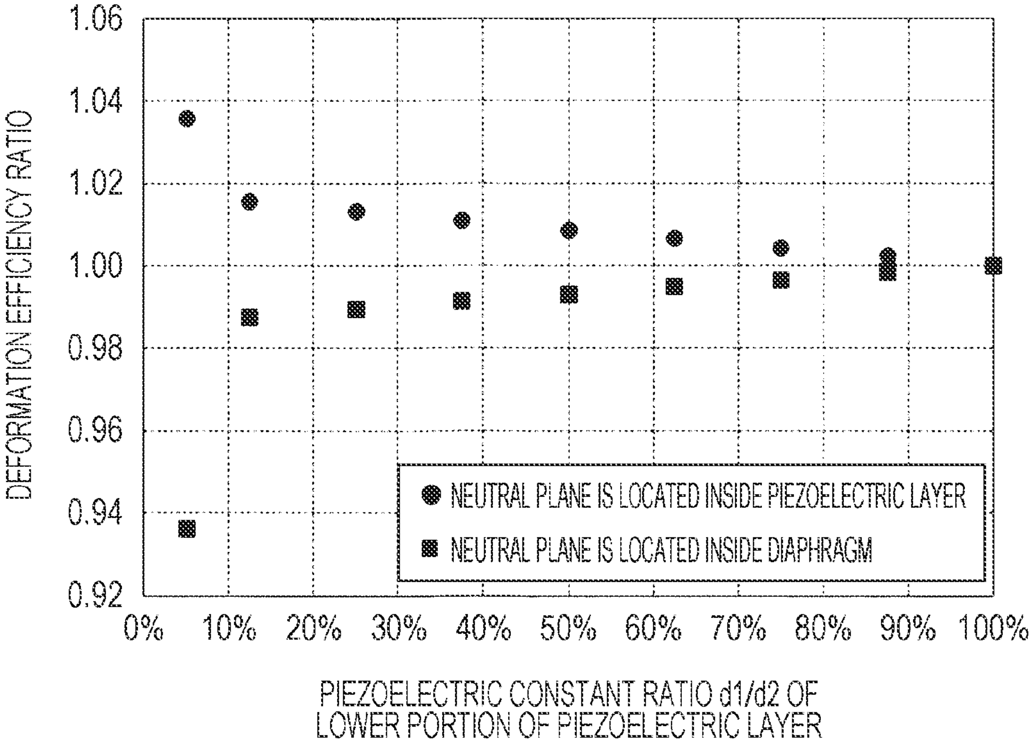
FIG. 8 is a graph that illustrates a relationship between the piezoelectric constant ratio of the lower portion of the piezoelectric layer and the deformation efficiency ratio of the stacked body.

FIG. 8 is a graph that illustrates a relationship between the piezoelectric constant ratio d1/d2 of the lower portion of the piezoelectric layer 56*b* and the deformation efficiency ratio of the stacked body LA. In FIG. 8, a relationship between the piezoelectric constant ratio d1/d2 and the deformation efficiency ratio of the stacked body LA illustrated in FIG. 7 described above is illustrated. The vertical axis of FIG. 8 represents the deformation efficiency ratio of the stacked body LA, and the horizontal axis thereof represents the piezoelectric constant ratio d1/d2.

As illustrated in FIG. 8, when the neutral plane AN is located inside the piezoelectric layer 56*b*, the lower the piezoelectric constant ratio d1/d2 is, the higher the deformation efficiency ratio of the stacked body LA is. This is because of an enhanced effect of not impeding the action of the upper region RT by the lower region RB.

From the viewpoint of obtaining a good effect of increasing the deformation efficiency ratio of the stacked body LA, it is preferable if the piezoelectric constant ratio d1/d2 is not greater than 25%, or more preferably, not greater than 12.5%.

By contrast, when the neutral plane AN is located inside the diaphragm 55, the lower the piezoelectric constant ratio d1/d2 is, the lower the deformation efficiency ratio of the stacked body LA is. This is simply because of a decrease in the piezoelectric constant of the layer that should contribute to the flexural deformation of the diaphragm 55 among the layers that make up the piezoelectric layer 56*b*. Moreover, when the neutral plane AN is located inside the diaphragm 55, the deformation efficiency ratio of the stacked body LA is lower throughout the entire range of the piezoelectric constant ratio d1/d2 between 0% and 100% as compared with when the neutral plane AN is located inside the piezoelectric layer 56*b*. This is because the thickness td of the diaphragm 55 is greater when the neutral plane AN is located inside the diaphragm 55 as compared with when the neutral plane AN is located inside the piezoelectric layer 56*b*.

As will be understood from the above-described results illustrated in FIG. 8, the piezoelectric constant of the lower region RB, though it suffices to be less than the piezoelectric constant of the upper region RT, may preferably be not greater than a half of the piezoelectric constant of the upper region RT. In this case, as compared with a configuration in which the piezoelectric constant of the lower region RB is greater than a half of the piezoelectric constant of the upper region RT, it is possible to improve the efficiency of deformation of the diaphragm 55 caused by being driven by the piezoelectric element 56. Moreover, since it is preferable if the piezoelectric constant ratio d1/d2 is not greater than 25% as described above, or more preferably, not greater than 12.5%, the piezoelectric constant of the lower region RB may more preferably be 25% or less of the piezoelectric constant of the upper region RT, or still more preferably, 12.5% or less thereof.

The piezoelectric constant of the lower region RB can be made less than the piezoelectric constant of the upper region RT by, for example, configuring the layers belonging to the lower region RB by means of crystal with preferred orientation on a plane other than a (100) plane and by configuring the layers belonging to the upper region RT by means of crystal with preferred orientation on the (100) plane among the layers LA1 to LA5. In this case, the layer LA5 is made of the crystal with preferred orientation on the (100) plane, and the layer LA1 is made of the crystal with preferred orientation on the plane other than the (100) plane. It is possible to make the piezoelectric constant of the lower region RB less than the piezoelectric constant of the upper region RT by adopting this configuration.

The lower region RB and the upper region RT may be made of piezoelectric materials different in composition from each other. For example, the lower region RB and the upper region RT are made of piezoelectric materials different in lead content from each other. In this case, even if each of the lower region RB and the upper region RT is configured by means of crystal with preferred orientation on the (100) plane, it is possible to make the piezoelectric constant of the lower region RB less than the piezoelectric constant of the upper region RT. Moreover, when the second piezoelectric layer is configured by means of crystal with preferred orientation on the (100) plane and the first piezoelectric layer is configured by means of crystal with preferred orientation on a plane other than the (100) plane, configuring the lower region and the upper region by means of piezoelectric materials different in composition from each other makes it possible to make the piezoelectric constant of the lower region less than the piezoelectric constant of the upper region more effectively.

The plurality of layers LA1 to LA5 making up the piezoelectric layer 56*b* may have crystalline states different from each other. For example, the layers belonging to the lower region RB may be in an amorphous state, and the layers belonging to the upper region RT may be in a polycrystalline state or a monocrystalline state.

It is preferable if an electric permittivity of the lower region RB is higher than an electric permittivity of the upper region RT. In this case, even when the lower region RB exists between the first electrode 56*a* and the upper region RT, it is possible to apply a voltage between the first electrode 56*a* and the second electrode 56*c* to the upper region RT more efficiently as compared with a configuration in which the electric permittivity of the lower region RB is not higher than the electric permittivity of the upper region RT.

FIG. 9 is a diagram illustrating a relationship between the conditions of samples Nos. 19 to 34, with the thickness of the lower portion of the piezoelectric layer 56*b* varied, and the deformation efficiency ratio of the stacked body LA.

In the samples Nos. 19 to 26, the neutral plane AN is located inside the piezoelectric layer 56*b*, similarly to the samples Nos. 1 to 9 described above. In the example illustrated in FIG. 9, the distance between the first electrode 56*a* and the neutral plane AN of the samples Nos. 19 to 26 is 115 nm. By contrast, in the samples Nos. 27 to 34, the neutral plane AN is located inside the diaphragm 55, similarly to the samples Nos. 10 to 18 described above. In the example illustrated in FIG. 9, the distance between the first electrode 56*a* and the neutral plane AN of the samples Nos. 27 to 34 is-275 nm.

The samples Nos. 19 to 34 have the equal thickness tp as one another, similarly to the samples Nos. 1 to 18 described above. However, the values of the thickness tpb of the samples Nos. 19 to 26 are different from one another. Similarly, the values of the thickness tpb of the samples Nos. 27 to 34 are different from one another. In the example illustrated in FIG. 9, the thickness tpb of the samples Nos. 19 and 27 is 0 nm, the thickness tpb of the samples Nos. 20 and 28 is 200 nm, the thickness tpb of the samples Nos. 21 and 29 is 300 nm, the thickness tpb of the samples Nos. 22 and 30 is 400 nm, the thickness tpb of the samples Nos. 23 and 31 is 600 nm, the thickness tpb of the samples Nos. 24 and 32 is 800 nm, the thickness tpb of the samples Nos. 25 and 33 is 1000 nm, and the thickness tpb of the samples Nos. 26 and 34 is 1200 nm.

The samples Nos. 19 to 34 have the equal piezoelectric constant d1, the equal piezoelectric constant d2, and the equal ratio d1/d2 as one another. In the example illustrated in FIG. 9, the piezoelectric constant d1 is 10 [pm/V], the piezoelectric constant d2 is 200 [pm/V], and the ratio d1/d2 is 5.0%.

Figure 10:
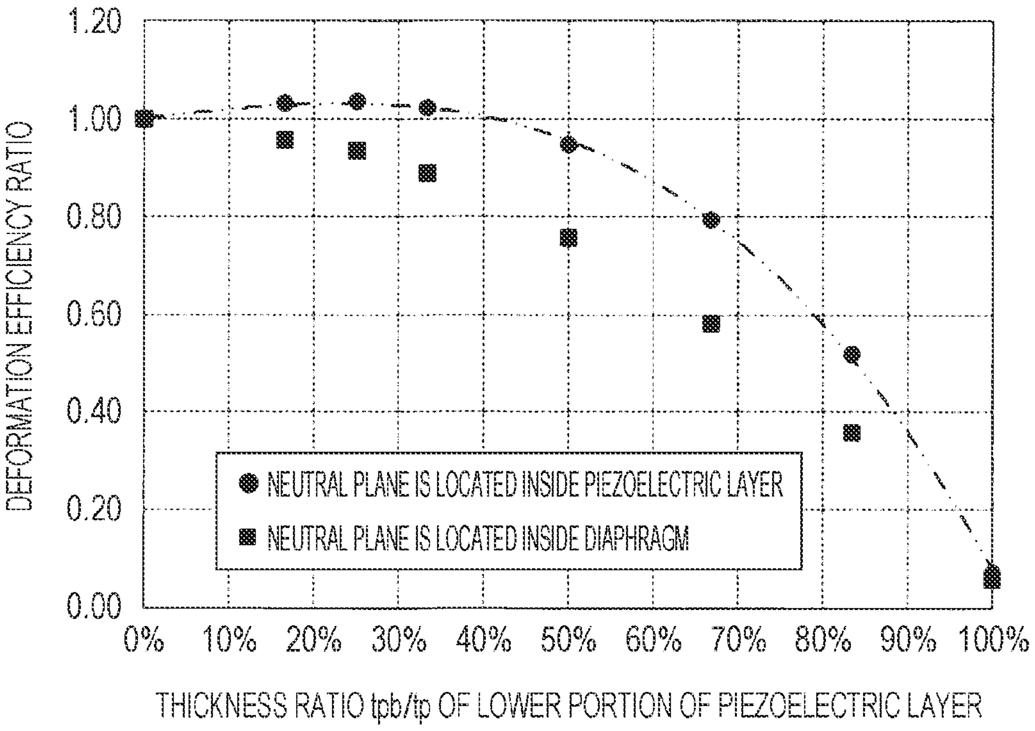
FIG. 10 is a graph that illustrates a relationship between the thickness ratio of the lower portion of the piezoelectric layer and the deformation efficiency ratio of the stacked body.

FIG. 10 is a graph that illustrates a relationship between the thickness ratio tpb/tp of the lower portion of the piezoelectric layer 56*b* and the deformation efficiency ratio of the stacked body LA. In FIG. 10, a relationship between the thickness ratio tpb/tp2 and the deformation efficiency ratio of the stacked body LA illustrated in FIG. 9 described above is illustrated. The vertical axis of FIG. 9 represents the deformation efficiency ratio of the stacked body LA, and the horizontal axis thereof represents the ratio tpb/tp2.

As illustrated in FIG. 10, when the neutral plane AN is located inside the piezoelectric layer 56*b*, an improvement in the displacement efficiency ratio of the stacked body LA achieved by decreasing the piezoelectric constant d1 of the layer LA1 can be observed in a range of the ratio tpb/tp of 40% or less. When the ratio tpb/tp is 40%, the thickness tpb is greater than the distance between the first electrode 56*a* and the neutral plane AN. Therefore, even when the thickness tpb is greater than the distance between the first electrode 56*a* and the neutral plane AN, an improvement in the displacement efficiency ratio of the stacked body LA achieved by decreasing the piezoelectric constant d1 of the layer LA1 can be observed.

By contrast, when the neutral plane AN is located inside the diaphragm 55, the higher the ratio tpb/tp is, the lower the deformation efficiency ratio of the stacked body LA is, throughout the entire range of the ratio tpb/tp from 0% to 100%. This is simply because of a decrease in the piezoelectric constant in the piezoelectric layer 56_b_ that should contribute to the flexural deformation of the diaphragm 55. Moreover, when the neutral plane AN is located inside the diaphragm 55, the deformation efficiency ratio of the stacked body LA is lower throughout the entire range of the ratio tpb/tp from 0% to 100% as compared with when the neutral plane AN is located inside the piezoelectric layer 56_b_. This is because the thickness td of the diaphragm 55 is greater and the deformation is thus more likely to be impeded when the neutral plane AN is located inside the diaphragm 55 as compared with when the neutral plane AN is located inside the piezoelectric layer 56_b_.

As will be understood from the above-described results illustrated in FIG. 10, it is preferable if the thickness tp1 of the lower region RB is less than the thickness tp2 of the upper region RT. In this case, it is possible to improve the efficiency of deformation of the diaphragm 55 caused by being driven by the piezoelectric element 56 by decreasing an action due to the inverse piezoelectric effect of the lower region RB as compared with a configuration in which the thickness tp1 of the lower region RB is not less than the thickness tp2 of the upper region RT. Moreover, based on the above-described relationship between the ratio tpb/tp and the deformation efficiency ratio, it is more preferable if the thickness tp1 of the lower region RB is 40% or lower of the thickness tp2 of the upper region RT.

As described above, in the liquid ejecting head 50, it is possible to improve the efficiency of deformation of the diaphragm 55 caused by being driven by the piezoelectric element 56 by making the piezoelectric constant of the lower region RB less than the piezoelectric constant of the upper region RT.

2. Variation Example

The embodiments described as examples above can be modified in various ways. Some specific examples of modification that can be applied to the embodiments described above are described below. Any two or more variation examples selected from the description below may be combined as long as they are not contradictory to each other or one another.

2-1. Variation Example 1

Figure 11:
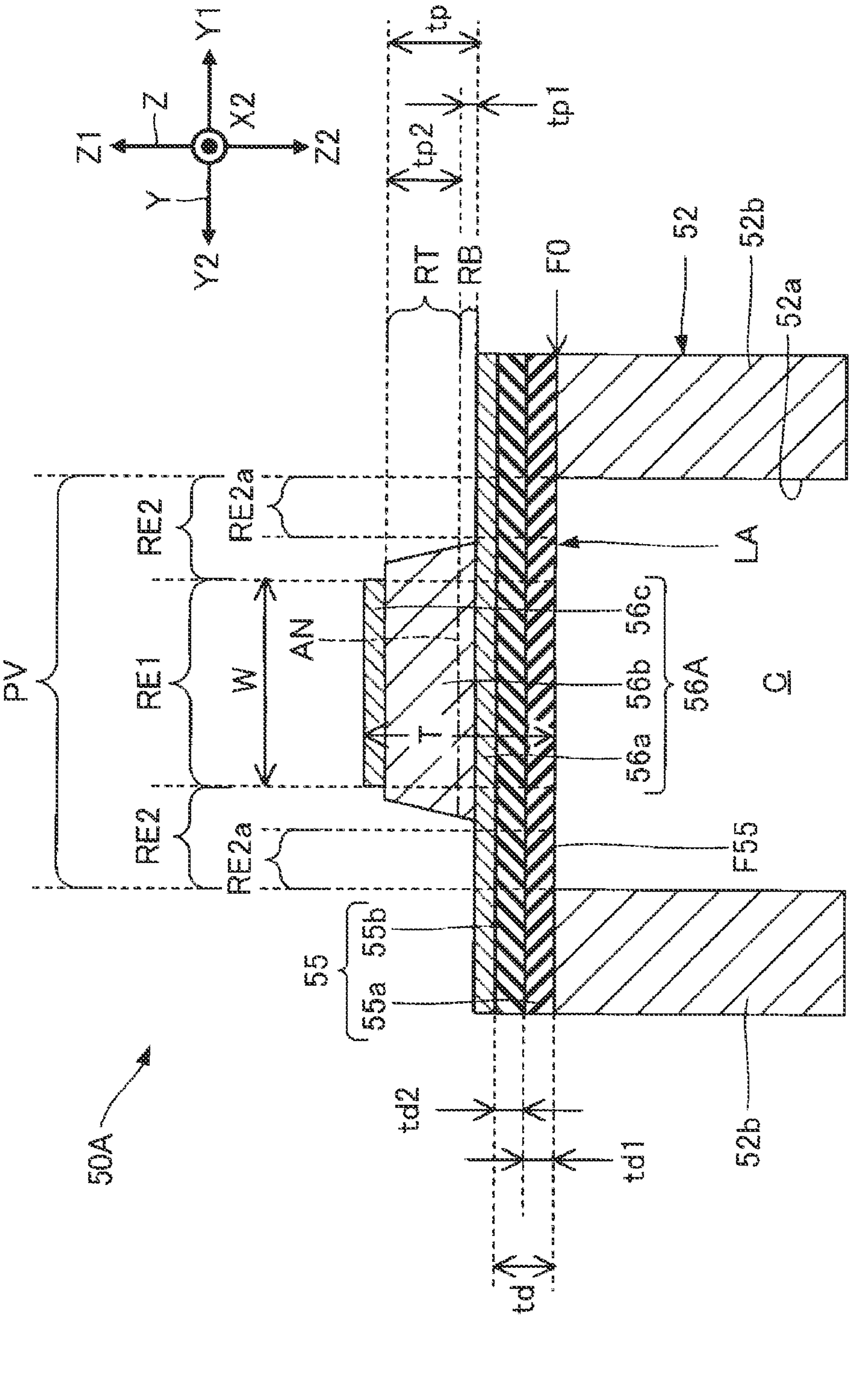
FIG. 11 is a cross-sectional view of a liquid ejecting head according to a variation example 1.

FIG. 11 is a cross-sectional view of a liquid ejecting head 50A according to a variation example 1. The liquid ejecting head 50A has the same structure as that of the liquid ejecting head 50 described above except that it includes a piezoelectric element 56A in place of the piezoelectric element 56. The piezoelectric element 56A has the same structure as that of the piezoelectric element 56 described above except that the first electrode 56_a_ is a common electrode and the second electrode 56_c_ is an individual electrode. That is, in the variation example 1, the first electrode 56_a_ is a band-like common electrode extending in the direction along the Y axis continuously throughout the plurality of piezoelectric elements 56A, whereas the second electrodes 56_c_ are individual electrodes disposed apart from one another to correspond individually to the piezoelectric elements 56A.

Even when configured as in the variation example 1 described above, it is possible to improve the efficiency of deformation of the diaphragm 55 caused by being driven by the piezoelectric element 56A by making the piezoelectric constant of the lower region RB less than the piezoelectric constant of the upper region RT.

Both the first electrode 56_a_ and the second electrode 56_c_ may be individual electrodes.

2-2. Variation Example 2

In the foregoing embodiments, the liquid ejecting apparatus 100 that is a so-called serial-type liquid ejecting apparatus configured to reciprocate the carriage 41 on which the liquid ejecting head 50 is mounted has been described as examples. However, the present disclosure may be applied to a so-called line-type liquid ejecting apparatus in which the plural nozzles N are arranged throughout the entire width of the medium M.

2-3. Variation Example 3

The liquid ejecting apparatus 100 disclosed as examples in the foregoing embodiments can be applied to not only print-only machines but also various kinds of equipment such as facsimiles and copiers, etc. Indeed, the scope of uses of the liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate.

3. Closing Overview of Present Disclosure

The following appendices provide a closing overview of the present disclosure.

Appendix 1: A liquid ejecting head according to a first mode, which is a preferred example of the present disclosure, includes: a piezoelectric element including a first electrode, a piezoelectric layer, and a second electrode; a pressure compartment substrate in which a pressure compartment communicating with a nozzle is provided; and a diaphragm that applies pressure to liquid in the pressure compartment by vibrating by being driven by the piezoelectric element. The pressure compartment substrate, the diaphragm, and the piezoelectric element are stacked in this order in a stacking direction. A neutral plane of a stacked body made up of the piezoelectric element and the diaphragm is located inside the piezoelectric layer. Of two regions obtained by dividing the piezoelectric layer with respect to the neutral plane, a region located closer to the diaphragm is defined as a lower region, and a region located farther from the diaphragm is defined as an upper region. A piezoelectric constant of the lower region is less than a piezoelectric constant of the upper region.

In the first mode described above, since the piezoelectric constant of the lower region is less than the piezoelectric constant of the upper region, the lower region is harder to be deformed by the voltage applied to the piezoelectric element. For this reason, the lower region functions as the diaphragm in substance and, accordingly, this suppresses the impediment by the deformation of the lower region due to the inverse piezoelectric effect to the deformation of the upper region due to the inverse piezoelectric effect. Consequently, even though the neutral plane of the stacked body made up of the piezoelectric element and the diaphragm is located inside the piezoelectric layer, it is possible to improve the efficiency of deformation of the diaphragm caused by being driven by the piezoelectric element. Furthermore, thinning the end portion of the diaphragm in the width direction makes it possible to achieve a further improvement in the deformation efficiency.

Appendix 2: In a second mode, which is a preferred example of the first mode, the pressure compartment has an elongated shape when viewed in the stacking direction, and an end of the pressure compartment in a direction of a shorter side does not overlap with the piezoelectric layer when viewed in the stacking direction. In the second mode described above, it is possible to make it easier for the end portion of the diaphragm in the width direction to deform. Therefore, it is possible to improve the efficiency of deformation of the diaphragm caused by being driven by the piezoelectric element.

Appendix 3: In a third mode, which is a preferred example of the first mode or the second mode, the piezoelectric constant of the lower region is not greater than a half of the piezoelectric constant of the upper region. In the third mode described above, as compared with a configuration in which the piezoelectric constant of the lower region is greater than a half of the piezoelectric constant of the upper region, it is possible to improve the efficiency of deformation of the diaphragm caused by being driven by the piezoelectric element.

Appendix 4: In a fourth mode, which is a preferred example of any of the first to third modes, the piezoelectric layer includes a plurality of layers, among the plurality of layers, a layer included in the lower region and located closest to the diaphragm is defined as a first piezoelectric layer, and a layer included in the upper region and located farthest from the diaphragm is defined as a second piezoelectric layer, the second piezoelectric layer is made of crystal with preferred orientation on a (100) plane, and the first piezoelectric layer is made of crystal with preferred orientation on a plane other than the (100) plane. In the fourth mode described above, it is possible to make the piezoelectric constant of the lower region less than the piezoelectric constant of the upper region.

Appendix 5: In a fifth mode, which is a preferred example of any of the first to fourth modes, a thickness of the lower region is less than a thickness of the upper region. In the fifth mode described above, as compared with a configuration in which the thickness of the lower region is not less than the thickness of the upper region, it is possible to improve the efficiency of deformation of the diaphragm caused by being driven by the piezoelectric element.

Appendix 6: In a sixth mode, which is a preferred example of any of the first to fifth modes, the lower region and the upper region are made of piezoelectric materials different in composition from each other. In the sixth mode described above, even if each of the lower region and the upper region is configured by means of crystal with preferred orientation on the (100) plane, it is possible to make the piezoelectric constant of the lower region less than the piezoelectric constant of the upper region. Moreover, when the second piezoelectric layer is configured by means of crystal with preferred orientation on the (100) plane and the first piezoelectric layer is configured by means of crystal with preferred orientation on a plane other than the (100) plane, configuring the lower region and the upper region by means of piezoelectric materials different in composition from each other makes it possible to make the piezoelectric constant of the lower region less than the piezoelectric constant of the upper region more effectively.

Appendix 7: In a seventh mode, which is a preferred example of any of the first to sixth modes, an electric permittivity of the lower region is higher than an electric permittivity of the upper region. In the seventh mode described above, even when the lower region exists between the first electrode and the upper region, it is possible to apply a voltage between the first electrode and the second electrode to the upper region more efficiently as compared with a configuration in which the electric permittivity of the lower region is not higher than the electric permittivity of the upper region.

Appendix 8: In an eighth mode, which is a preferred example of any of the first to seventh modes, the pressure compartment has an elongated shape when viewed in the stacking direction, the first electrode, the piezoelectric layer, and the second electrode are stacked in this order in the stacking direction, and the second electrode includes a portion disposed on a side surface of each of the lower region and the upper region. In the eighth mode described above, it is possible to configure the first electrode as an individual electrode and configure the second electrode as a common electrode.

Appendix 9: A liquid ejecting head according to a ninth mode, which is a preferred example of the present disclosure, includes: a piezoelectric element including a first electrode, a piezoelectric layer, and a second electrode; a pressure compartment substrate in which a pressure compartment communicating with a nozzle is provided; and a diaphragm that applies pressure to liquid in the pressure compartment by vibrating by being driven by the piezoelectric element, wherein the pressure compartment substrate, the diaphragm, and the piezoelectric element are stacked in this order in a stacking direction, a neutral plane of a stacked body made up of the piezoelectric element and the diaphragm is located inside the piezoelectric layer, the piezoelectric layer includes a first piezoelectric layer made of crystal with preferred orientation on a plane other than a (100) plane, and a second piezoelectric layer made of crystal with preferred orientation on the (100) plane, the first piezoelectric layer is located between the diaphragm and the neutral plane, and the neutral plane is located between the first piezoelectric layer and the second piezoelectric layer.

In the ninth mode described above, of two regions obtained by dividing the piezoelectric layer with respect to the neutral plane, the region located closer to the diaphragm is defined as the lower region, and the region located farther from the diaphragm is defined as the upper region, and, when this definition is given, it is possible to make the piezoelectric constant of the lower region less than the piezoelectric constant of the upper region. For this reason, the lower region is harder to be deformed by the voltage applied to the piezoelectric element and, therefore, the lower region functions as the diaphragm in substance and, accordingly, this suppresses the impediment by the deformation of the lower region due to the inverse piezoelectric effect to the deformation of the upper region due to the inverse piezoelectric effect. Consequently, even though the neutral plane of the stacked body made up of the piezoelectric element and the diaphragm is located inside the piezoelectric layer, it is possible to improve the efficiency of deformation of the diaphragm caused by being driven by the piezoelectric element. Furthermore, thinning the end portion of the diaphragm in the width direction makes it possible to achieve a further improvement in the deformation efficiency.

Appendix 10: A liquid ejecting apparatus according to a tenth mode, which is a preferred example of the present disclosure, includes: the liquid ejecting head according to any of the first to ninth modes; and a controller that controls driving of the liquid ejecting head. In the tenth mode described above, since the liquid ejecting head has excellent ejecting characteristics, it is possible to provide the liquid ejecting apparatus that offers excellent ejecting characteristics.

What is claimed is:

1. A liquid ejecting head, comprising:

a piezoelectric element including
  a first electrode,
  a piezoelectric layer, and
  a second electrode;

a pressure compartment substrate in which a pressure compartment is provided; and a diaphragm that applies pressure to liquid in the pressure compartment by vibrating by being driven by the piezoelectric element, wherein the pressure compartment substrate, the diaphragm, and the piezoelectric element are stacked in this order in a stacking direction, a neutral plane of a stacked body made up of the piezoelectric element and the diaphragm is located inside the piezoelectric layer, of two regions obtained by dividing the piezoelectric layer in the stacking direction with respect to the neutral plane, a region located below the neutral plane in the stacking direction is defined as a lower region, and a region located above the neutral plane in the stacking direction is defined as an upper region, and a piezoelectric constant of the lower region is less than a piezoelectric constant of the upper region.

2. The liquid ejecting head according to claim 1, wherein the pressure compartment has an elongated shape when viewed in the stacking direction, and an end of the pressure compartment in a direction of a shorter side does not overlap with the piezoelectric layer when viewed in the stacking direction.

3. The liquid ejecting head according to claim 1, wherein the piezoelectric constant of the lower region is not greater than a half of the piezoelectric constant of the upper region.

4. The liquid ejecting head according to claim 1, wherein the piezoelectric layer includes a plurality of layers, among the plurality of layers, a layer included in the lower region and located closest to the diaphragm is defined as a first piezoelectric layer, and a layer included in the upper region and located farthest from the diaphragm is defined as a second piezoelectric layer, the second piezoelectric layer is made of crystal with preferred orientation on a (100) plane, and the first piezoelectric layer is made of crystal with preferred orientation on a plane other than the (100) plane.

5. The liquid ejecting head according to claim 1, wherein a thickness of the lower region is less than a thickness of the upper region.

6. The liquid ejecting head according to claim 5, wherein a ratio of the thickness of the lower region to a thickness of the piezoelectric layer is not greater than 40%.

7. The liquid ejecting head according to claim 1, wherein the lower region and the upper region are made of piezoelectric materials different in composition from each other.

8. The liquid ejecting head according to claim 1, wherein an electric permittivity of the lower region is higher than an electric permittivity of the upper region.

9. The liquid ejecting head according to claim 1, wherein the pressure compartment has an elongated shape when viewed in the stacking direction, the first electrode, the piezoelectric layer, and the second electrode are stacked in this order in the stacking direction, and the second electrode includes a portion disposed on a side surface of each of the lower region and the upper region.

10. A liquid ejecting apparatus, comprising:

the liquid ejecting head according to claim 1; and a controller that controls driving of the liquid ejecting head.

11. A liquid ejecting head, comprising:

a piezoelectric element including
  a first electrode,
  a piezoelectric layer, and
  a second electrode;

a pressure compartment substrate in which a pressure compartment is provided; and a diaphragm that applies pressure to liquid in the pressure compartment by vibrating by being driven by the piezoelectric element, wherein the pressure compartment substrate, the diaphragm, and the piezoelectric element are stacked in this order in a stacking direction, a neutral plane of a stacked body made up of the piezoelectric element and the diaphragm is located inside the piezoelectric layer, the piezoelectric layer includes
  a first piezoelectric layer made of crystal with preferred orientation on a plane other than a (100) plane, and
  a second piezoelectric layer made of crystal with preferred orientation on the (100) plane, the first piezoelectric layer is located between the diaphragm and the neutral plane, and the neutral plane is located between the first piezoelectric layer and the second piezoelectric layer.

* * * * *